Jan. 13, 1953     A. F. TREMBLAY     2,625,195
BARREL DENT-REMOVING MACHINE
Filed Jan. 31, 1950     6 Sheets-Sheet 1
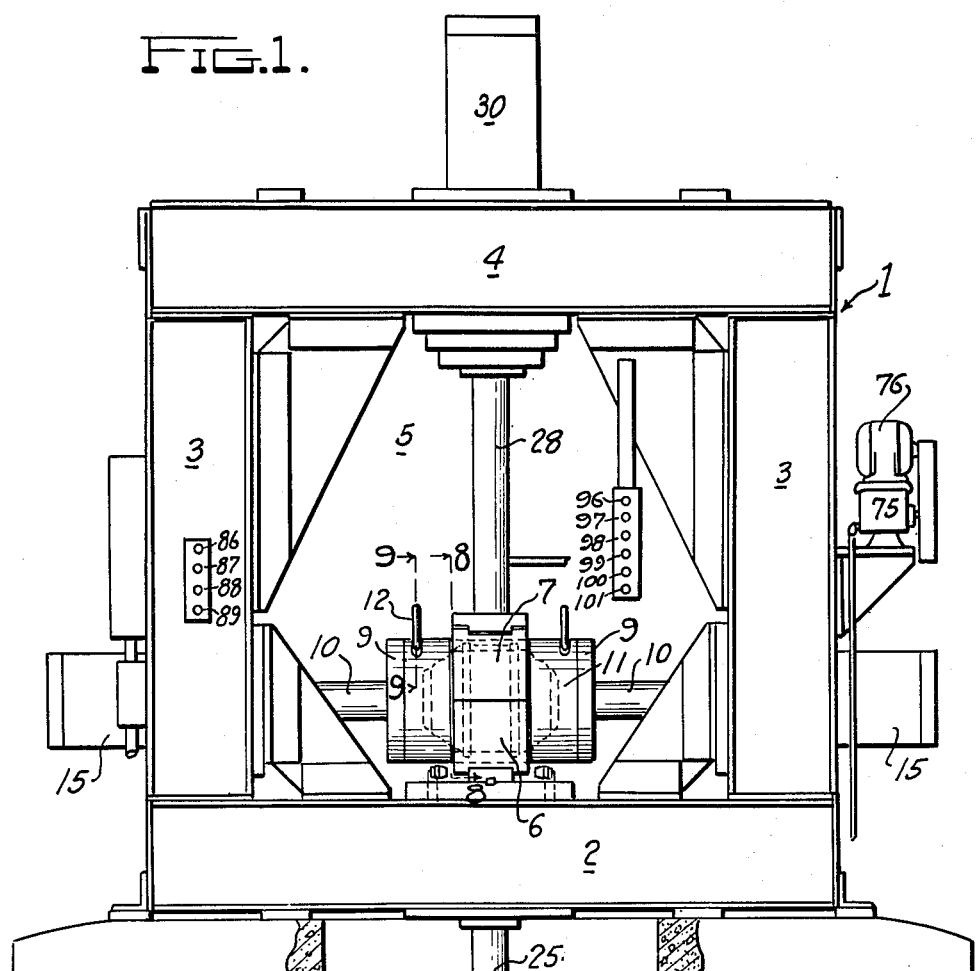
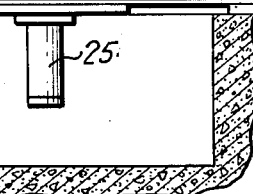
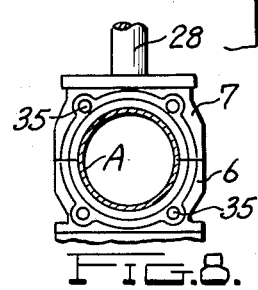
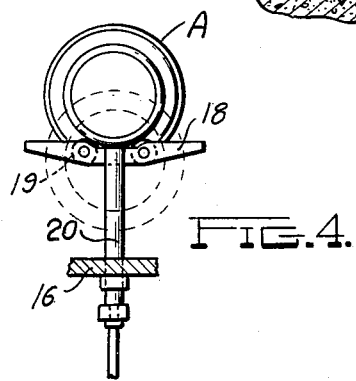
INVENTOR.
Albert F. Tremblay
BY Owen & Owen
ATTORNEYS Jan. 13, 1953 A. F. TREMBLAY 2,625,195
BARREL DENT-REMOVING MACHINE
Filed Jan. 31, 1950 6 Sheets-Sheet 2
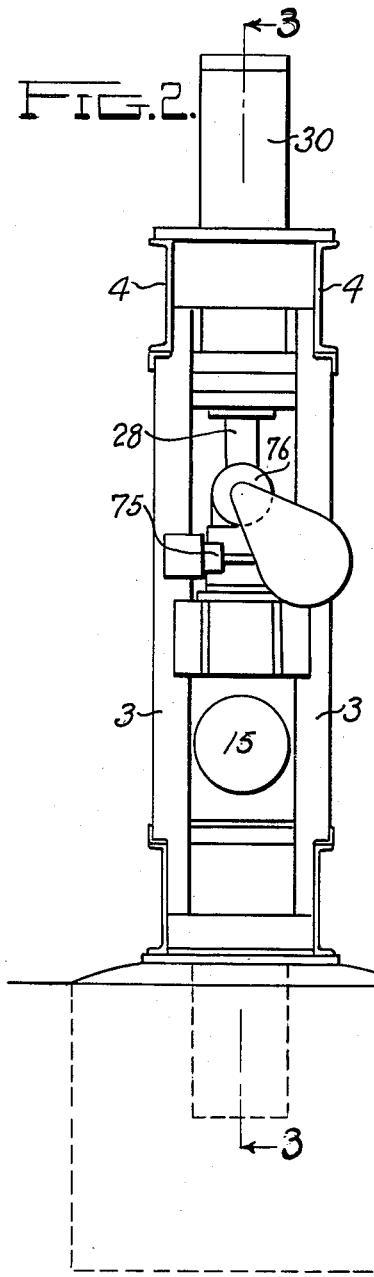
FIG.2.
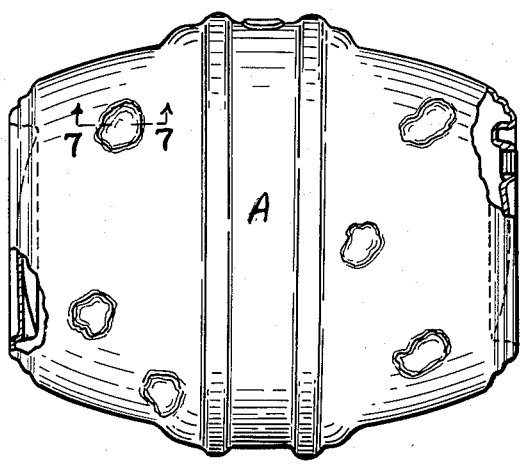
FIG.6.
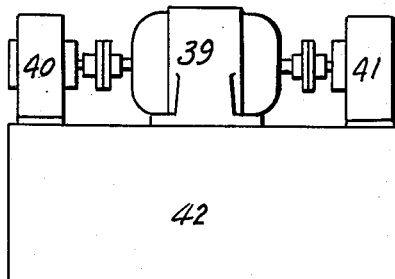
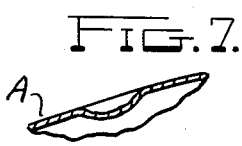
FIG.7.
INVENTOR.
Albert F. Tremblay
BY
ATTORNEYS

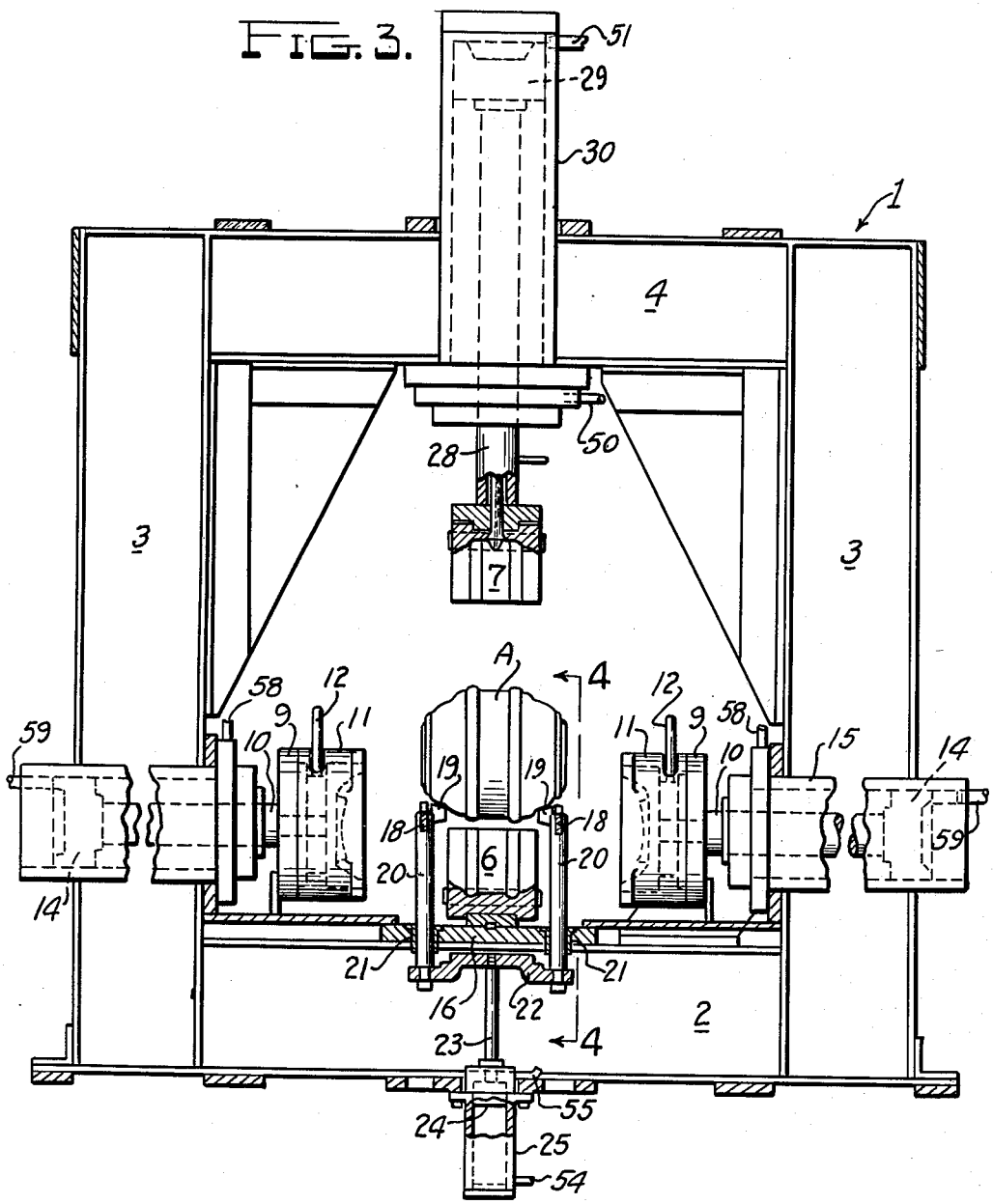

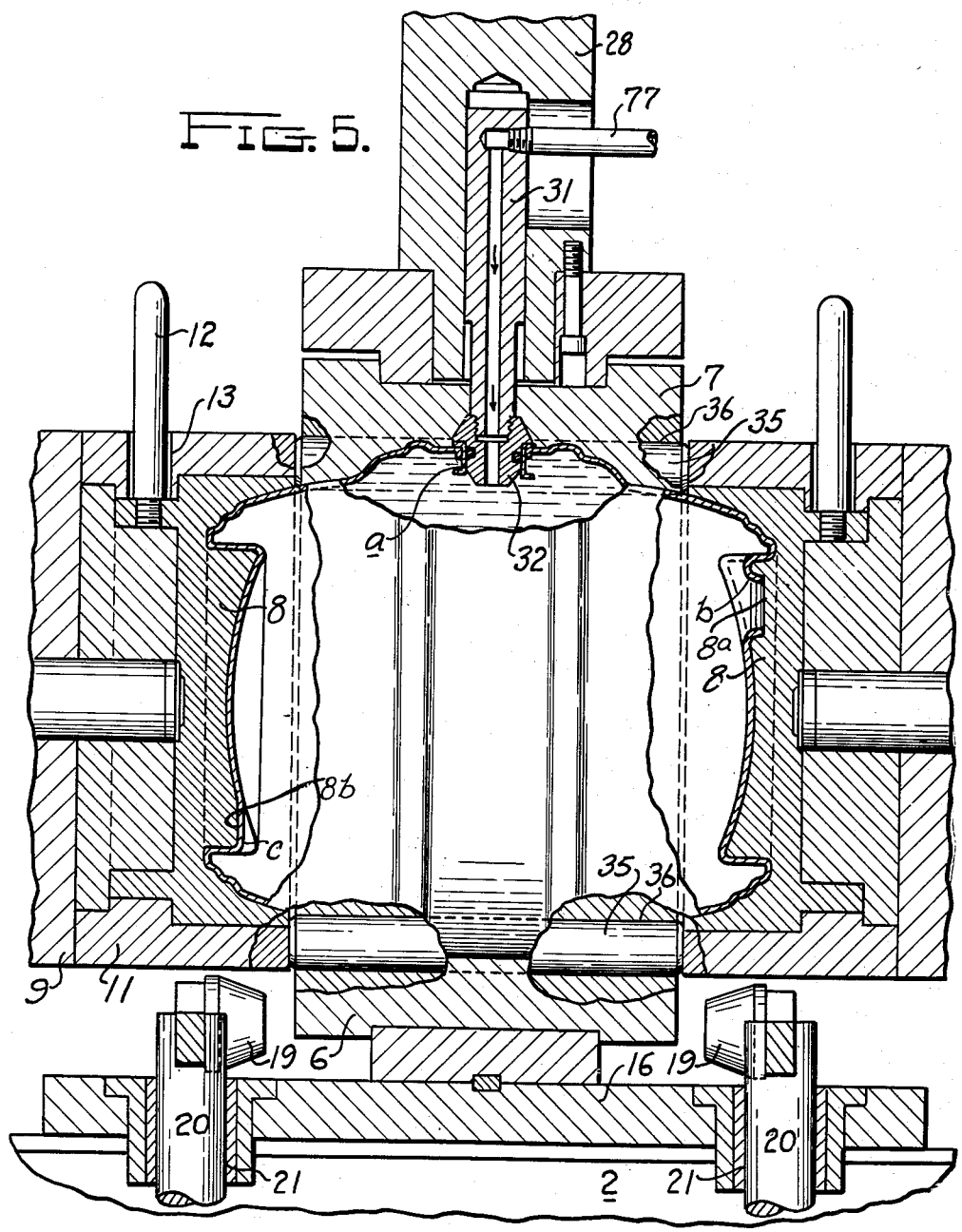

Jan. 13, 1953  A. F. TREMBLAY  2,625,195
BARREL DENT-REMOVING MACHINE
Filed Jan. 31, 1950  6 Sheets—Sheet 5
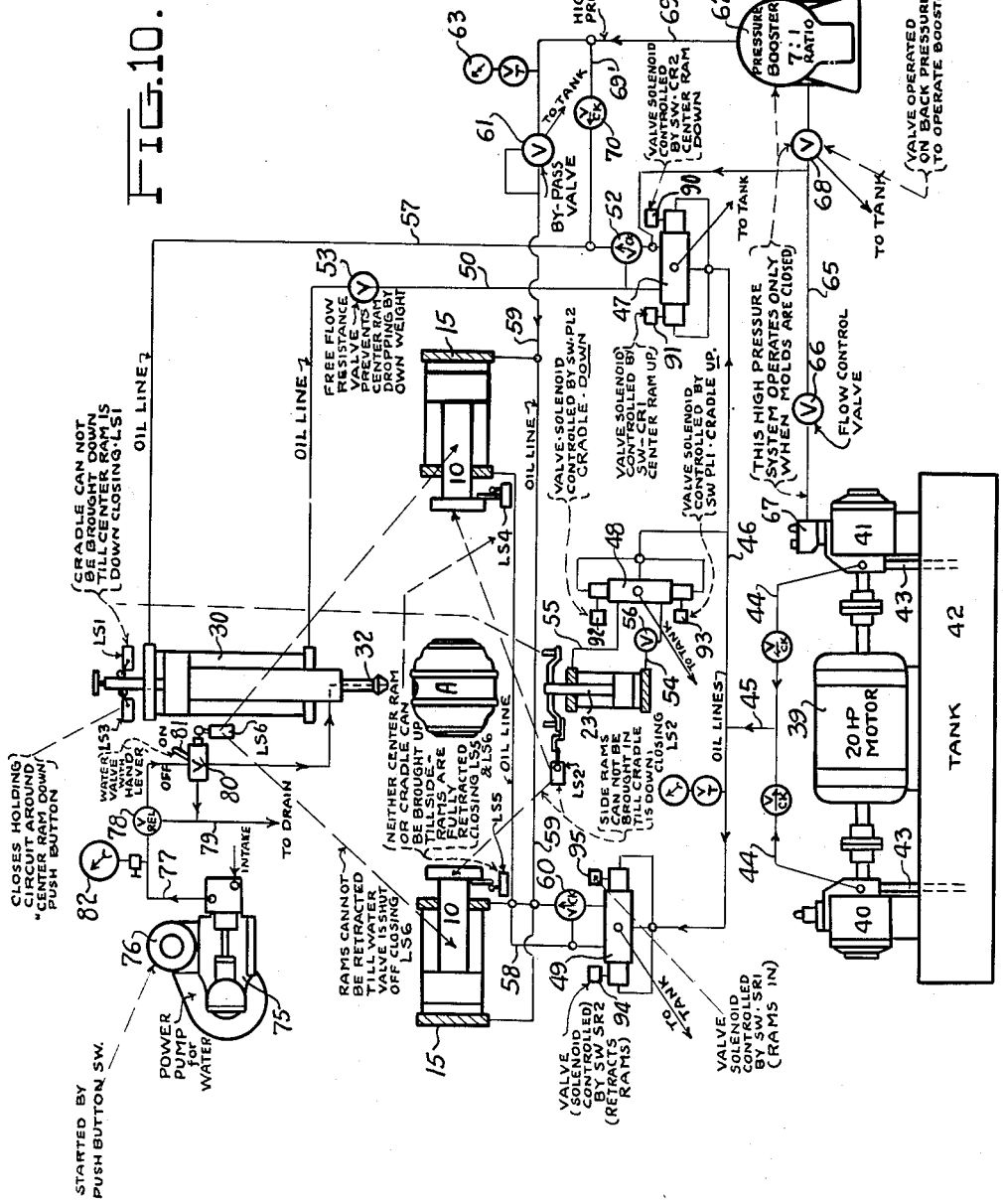
INVENTOR.
Albert F. Tremblay
BY
ATTORNEYS

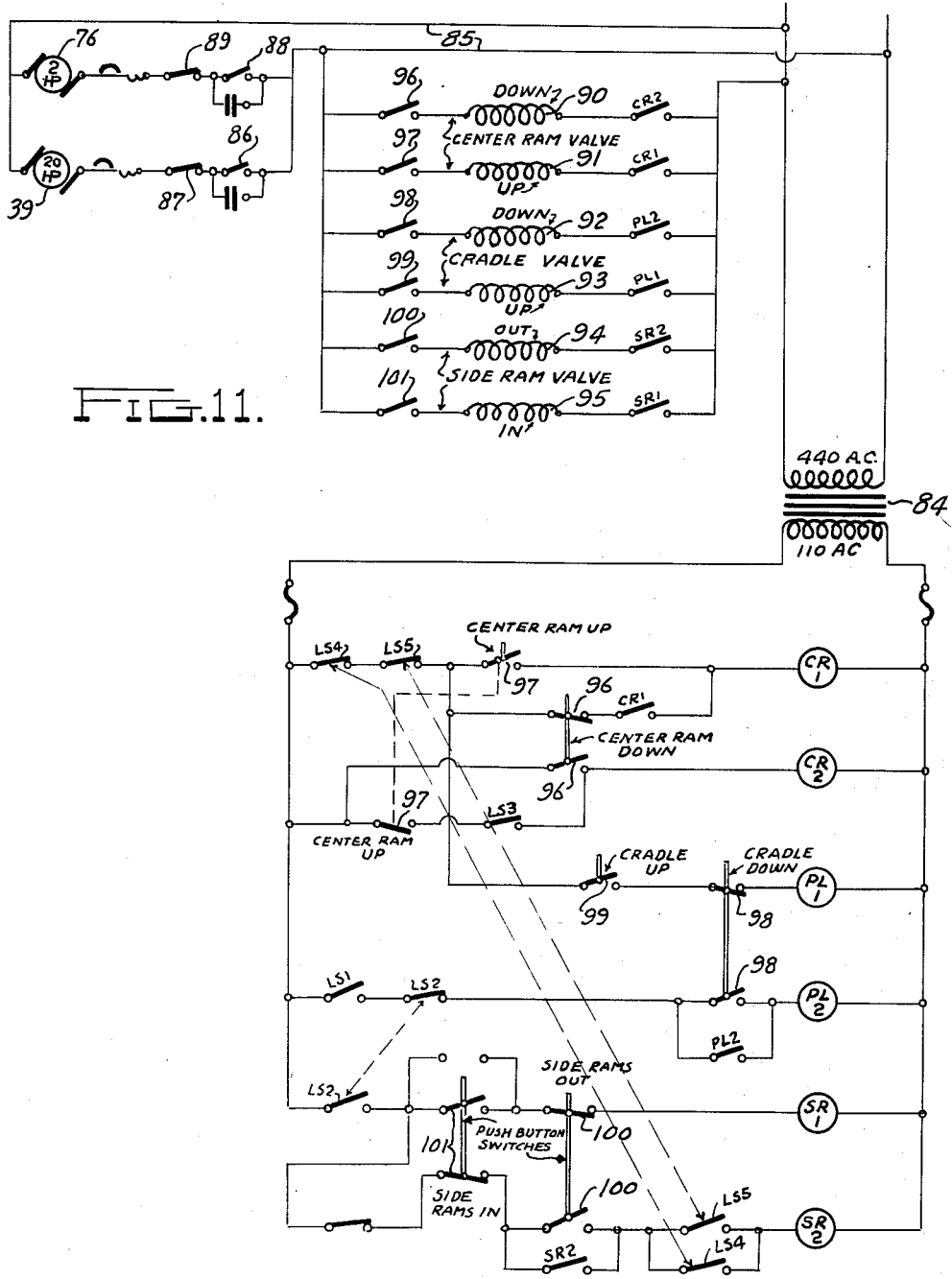

Patented Jan. 13, 1953

2,625,195

UNITED STATES PATENT OFFICE 2,625,195

BARREL DENT-REMOVING MACHINE

Albert F. Tremblay, Toledo, Ohio, assignor to Kent-Owens Machine Company, Toledo, Ohio, a corporation of Ohio Application January 31, 1950, Serial No. 141,477

15 Claims. (Cl. 153—32)

This invention relates to means for removing dents, depressions, or the like, from metallic barrels or similar articles in which liquids are shipped.

Metal barrels used particularly in the storing, shipping and handling of beer and other liquids are subjected to hard and damaging use, as they are frequently dropped from considerable heights onto floors, platform, or the like, and are thereby dented or bulged out a greater or less extent, resulting in a change in capacity. This denting and bulging frequently changes the barrel capacity ten percent or more and is thus a serious item in the sale of beer or the like, inasmuch as a specified tax is paid based on the original capacity of the barrel and the customer may receive a quantity greater or less than that contained in a normal barrel.

The object of this invention is the provision of a machine of novel construction and operation for subjecting a dented barrel or similar container to a uniform internal expanding pressure while held within dies, whereby the dents are removed and the barrel or container is caused to return to its original contour in a simple, rapid and inexpensive manner.

Other objects and advantages of the invention will be apparent from the following detailed description, and from the accompanying drawings illustrating one embodiment of the invention, in which Fig. 1 is a front elevation of a machine embodying the invention, with the dies in closed work-holding relation; Fig. 2 is a right-hand side elevation of the machine; Fig. 3 is an enlarged front elevation similar to Fig. 1, with the holding dies retracted and the barrel raised by the elevating cradle, and with parts broken away and removed; Fig. 4 is a fragmentary section on the line 4—4 in Fig. 3; Fig. 5 is an enlarged fragmentary section of the barrel-holding parts of the machine in holding engagement with the barrel; Fig. 6 is a side view of a dented barrel, with parts broken away; Fig. 7 is an enlarged section on the line 7—7 in Fig. 6 taken through a dent in the barrel; Figs. 8 and 9 are sections on the lines 8—8 and 9—9, respectively, in Fig. 1; Fig. 10 is a diagrammatical view of the barrel-holding and expanding pressure systems showing the relative arrangement of limit switches, and Fig. 11 is a diagrammatical view of the wiring diagram employed.

General description of machine

Referring to the drawings, 1 designates the machine frame comprising a base 2, opposing side uprights 3, 3, and a top member 4 combining to define a central opening 5 in which holding or confining dies for the container, which will hereinafter be referred to as a barrel, are located. Each of said base, side and top parts comprises, in the present instance, a pair of spaced channel beam members. The sectional holding mold for the barrel, in the present instance, includes a bottom die 6, an opposing top center die 7, and two opposing side dies 8, 8. The top and bottom dies cooperate to completely encircle the barrel circumferentially thereof in spaced relation to its ends, while the end dies engage over the respective ends of the barrel to the line of engagement of the top and bottom dies and cooperate with such dies to form a cavity conforming to the original external shape of the barrel.

The side dies 8, as best shown in Fig. 5, are mounted for coaxial reciprocatory movements with respective ram heads 9 carried by right and left rams 10 that have strokes imparted thereto, as hereinafter described. Each ram head 9 has a rim member 11 of ring-form fixed thereto and circumferentially embracing the die to permit it to turn therein. Each die 8 has a control handle 12 projecting radially therefrom through a slot 13 in the rim 11 and this handle may be grasped and moved to effect a partial turning of the die in the head for the purpose hereinafter described.

Each ram 10 has a piston 14 at its outer end operating in a respective cylinder 15 mounted between the associated upright members 3. The ends of the cylinders are closed, except for the admission and exhaust of an operating fluid, as hereinafter described.

The lower and upper dies or mold sections 6 and 7, in the present instance, are each semi-circular in form to combine to conform to the circumferential shape and size of the barrel or container A to be operated on, and terminate at their end edges short of the ends of the barrel and in positions to coact with the side dies 8 to close the barrel receiving cavity when the dies are in closed relation, as shown in Fig. 5. The lower die is mounted on a platform 16 that rests rigidly on the top edges of the spaced base members 2.

The barrel A is raised and lowered with respect to the lower die 6 by a pair of cradle members 18 spaced axially of an engaged barrel, and each member has a pair of rolls 19 spaced transversely of the barrel and serving to hold an engaged barrel in centered relation with respect to the dies. The members 18 extend outward in either direction from the rolls to facilitate placing a barrel in centered position on the rolls. Each cross-member 18 is centrally supported on the top of a vertical bar or standard 20 that extends down through a registering guide 21 in the platform 16 and is attached at its lower end to a cross-bar 22 on the upper end of a ram 23. This ram enters, and has a piston 24 operating in, a vertical cylinder 25 suspended between the base members 2. The control of the piston movements to raise and lower the cradle members will be later described.

The upper die 7 is carried at the lower end of a ram or plunger 28 that has a piston 29 at its upper end operating in a cylinder 30. This cylinder is mounted in vertical position between the top frame members 4 and has communication at its ends with a fluid pressure source as hereinafter described. The lower end portion of the ram 28 is provided with an axially disposed tubular plug 31 that extends through the die 7 and has a nozzle 32 at the inner side of the die for fitting closely into the bunghole of a barrel A when the die is lowered into clamping engagement therewith. The tube bore at its inner end has connection with a source of fluid pressure supply as and for the purpose hereinafter described.

In the general operation of the machine, the barrel A to be operated on for the purpose of removing the dents thereon may either be placed directly in the lower die 6 when the dies are in separated relation, or it may be placed on the rolls 19 of the cradle bars 18 and then lowered into the die 6 by a lowering of the cradle ram 23 in its cylinder. The top die 7 is then lowered into position over the barrel by a lowering of its ram 28 so that it cooperates with the lower die to circumferentially embrace the barrel with the end portions of the barrel projected slightly therefrom, as indicated in Figs. 1 and 5, and the nozzle 32 is permitted to enter the bung hole a. The side dies 8, 8 are then brought into position for adjustment. The operator moves handles 12 to turn the dies 8 in the ram heads to enable the depression 8a in the right hand die to find, and center with, the projection b on the adjacent end of the barrel and to enable the depression c in the sump end of the barrel to find, and center with, a mating portion 8b of the left hand die. The bung and sump are not in a fixed or set relation with regard to the center bung and in some cases the inaccuracy is such that the openings vary over more than 30° of the circumference of the barrel. The hand adjustment is, therefore, necessary to enable the machine to operate on barrels having a wide range of irregularities. When these centers have been found, fluid pressure is put on the ends of the cylinders to force the side dies into close binding engagement with the barrel ends and closely against the respective ends of the bottom and top dies 6 and 7, or against stop pins 35 thereon.

The stop pins are inserted into openings 36 through the dies and project a predetermined distance from the die ends to serve as spacers for the center and side dies to compensate for varying lengths of barrels acted on. The float of the pins 35 allows the side dies to automatically position themselves to suit the barrel. It is found in practice that the barrels may vary not only in length but that the center bung may not be in the center of the barrel lengthwise. It is, therefore, necessary to provide some stop adjusting means for the dies to compensate for these inaccuracies.

When a barrel has been properly clamped within the cavity formed by the several dies, a fluid, preferably water, is introduced under pressure into the barrel through the nozzle 32 and exerts an expanding pressure thereon to force the barrel walls closely to the dies and thereby remove dents from the barrel and return it to its original shape. In practice, it is preferable to fill the barrel with water before placing it in the machine so that a comparatively small amount of water is used in introducing pressure through the nozzle 32. When sufficient pressure has been applied to remove the barrel dents, the controls are operated first to shut off and relieve the hydraulic expanding pressure; then to retract the upper die 7, and afterwards the two sides dies 8, 8, and finally to elevate the cradle support 22 to raise the barrel to convenient position for removal from the machine.

*Control system for die and cradle movements*

The several cylinders 15, 25 and 30 are all parts of a fluid pressure operating system of which the prime mover for the operating fluid, oil in the present instance, is the two pumps 40, 41, operated by an electric motor 39. The pumps are fed from a supply tank 42 through inlet pipes 43 (Fig. 10) and each has a check-valve controlled outlet line 44 connecting through a common line 45 with a line 46 leading to the four-way valves 47, 48 and 49 to control, respectively, the supply of operating oil to the top center ram cylinder 30, the cradle ram cylinder 25 and the two side ram cylinders 15. These valves are solenoid operated as hereinafter described. Lines 50 and 51 lead from the valve 47 to the lower and upper ends of the center cylinder 30, the latter having a check-valve 52 with a cross-connection to the line 50, and the line 50 having a free flow resistance valve 53 therein which prevents the center ram 28 from dropping of its own weight.

The valve 48 admits low pressure oil to opposite ends of the cradle-ram cylinder 25 through leads 54 and 55, and the former has a free flow resistance valve 56 therein which is adjustable to prevent the weight of the cradle parts and barrel from depressing the ram. Any additional pressure, however, from either the lowering of the center ram 28 or from oil pressure through the four-way valve 48 will cause the cradle and barrel to move down.

The four-way valve 49 has connection with the inner ends of both side cylinders 15 through a line 58 and with the outer ends of the cylinders through a line 59. A check-valve 60 is located in the line 59 and is opened through its pilot by the pump pressure, thereby allowing the oil in the rear or outer end of the cylinders 15 to return to the tank 42. Back pressure in the line 59 will open a sequence valve 61 and allow high pressure oil from a pressure booster 62 to flow into the line 59 and thereby feed the outer ends of the cylinders 15. A gauge 63, connected with the line 59, will first show a drop in pressure as the valve 61 is opened, but the pressure will immediately be built up by the booster 62.

The pressure from the pumps 40, 41, backs up from the line 51 through the line 65 and control valve 66 to the pressure governor 67 on pump 41. This back pressure operates a dual pressure control so that the pump 41 delivers a higher pressure to feed the booster 62. This same back pressure opens sequence valve 68 and allows the output of pump 41 to reach and operate the booster 62. The booster delivers oil at high pressure through lines 69 and 69' and check-valve 70 to the line 51 which feeds the upper end of the center ram cylinder 30, and also through 69 to the line 59 feeding the outer ends of the side ram cylinders 15, this pressure being registered on the gauge 63.

*Internal barrel-pressure system*

As shown in Fig. 10, this pressure means includes a water pump 75 driven by an electric motor 76, and operates to build up pressure in the outgoing line 77 until the relief valve 78 is opened by the pressure for which set and then by-passes the water through the drain line 79. The line 77 leads to the channel in the nozzle plug 31 and thence through the nozzle 32 and bung to the interior of the connected barrel. A manual control valve 80 is disposed in the nozzle side of the line 77 and is controlled by a handle 81 so that when the handle is in "on" position the line is open to the nozzle. When the handle is in "off" position the nozzle connection is closed to the supply source and opened to the drain 79 to relieve the pressure at the nozzle. A gauge 82 indicates the pump line pressure and will show a drop in pressure when the valve 80 is open. The pressure, however, will build up gradually as the dents in the barrel are removed, and when the maximum pressure for which the machine is set is reached, the dents will have been removed and the relief valve 78 will open to the drain.

*Electrical control system*

The electrical control system, as shown diagrammatically in Fig. 11, includes a transformer 84, in the primary circuit 85 of which, in parallel circuits, are disposed the motor 39 and 76 for the oil pumping and water pumping systems, respectively. In series with the motor 76 are "start" and "stop" switches 88 and 89. These switches are controlled by push buttons of corresponding numbers located on the press frame, as shown at the left of Fig. 1. Each of these two motor lines is connected in parallel with six parallel lines in the primary circuit, each having a solenoid therein for opening or closing a respective four-way valve in the ram operating system. In the present instance, the center ram valve 47 is controlled by a "down" solenoid 90 and an "up" solenoid 91; the cradle ram valve 48 is controlled by a "down" solenoid 92 and an "up" solenoid 93, and the valve 49 for the side rams is controlled by an "out" solenoid 94 and an "in" solenoid 95. Associated with each of these solenoids 90 to 95 is a respective manual control switch 96, 97, 98, 99, 100 and 101, so that any solenoid may be selectively energized by a closing of its switch. The control buttons for these switches are shown in Fig. 1 and bear corresponding numbers. In addition to the manual control switch, the circuit for each of the main solenoids may be opened by a series switch operated by a solenoid in the secondary transformer circuit shown in the lower portion of Fig. 11. This circuit includes interlocked switches, as indicated, corresponding to and bearing the same numbers as the respective solenoid switches. Similarly, the solenoids in the secondary interlocked control circuits are numbered correspondingly to the series switches associated therewith.

A limit switch LS1 is located in the series control circuit for the "down" solenoid 92 of the cradle ram control valve 48 and is closed by contact 105 on center top ram 30 when such latter ram is down. Thus, the cradle ram cannot be brought down from raised barrel receiving position until the center top ram is down, since LS1 is in series with solenoid PL2, and if associated switch PL2 is open, the cradle valve circuit cannot be closed.

A limit switch LS2 is disposed in the series control circuit for both the "cradle ram down" control switch 98 and the "side rams out" control switch 100. This limit switch is closed by the cradle when in a nearly completed down movement, so that said rams cannot be moved inward into mold or die-closing position until the cradle is completely down, in which position the barrel ends register with the side dies 8. It also operates to open the circuit to push-button 98 (cradle down) and de-energizes the "down" solenoids 91.

A limit switch LS3 is located to be closed by contact dog 105 on the center ram 30 when down and is disposed in a holding circuit around the "center ram down" push-button. When the push-button is released, the "down" solenoid 90 controlling the down movement of the center ram 30 will remain energized, preventing the associated valve 47 from coming into neutral and thus maintaining down pressure on the center ram.

Limit switches LS4 and LS5 are disposed in the "center ram down" circuit and also in the "side rams in" circuit and are positioned to be engaged and opened by the two side rams 10 when completely retracted or in "out" positions. These switches have two functions. (1) They close the circuit to both the push-button 97 for "center ram up" and the push-button 99 for "cradle ram up," so that both center ram and cradle ram can be raised. (2) They open the circuit to the push-button 100 for "side rams out" to de-energize the solenoid 94 of control valve 49 and allow the valve to move to neutral position.

Limit switch LS6 is located in position to be opened by the control valve 80 of the water pressure system when such valve is open or in "on" position. Opening of this switch opens the circuit to "side rams out" switch 100 so that the side rams cannot be moved out to open the mold while water pressure is in the barrel. When the water valve 80 is moved to "off" position, LS6 closes "side rams out" circuit, allowing the side rams to be retracted.

*Operation*

In the operation of the machine, it is preferable to first press the starter button 86 for the motor 39 so as to build up the necessary oil pressure in the ram-operating system. The starter button 88 for the water motor pump 76 is next pressed to provide pressure in the water pressure system. The cradle 18, if in lowered position, can now be raised to barrel receiving position by pressing the switch button 99 to energize the "cradle up" solenoid 93. A barrel A to be reconditioned, having been placed on the cradle preferably after having first filled the barrel with water, the switch button 98 for the "down" solenoid 92 is pushed, causing a lowering of the cradle to seat the barrel in the lower die 6 and place the barrel ends in register with the end dies 8, 8, of the shaping or reconditioning mold. In placing the barrel on the cradle care should be taken to have the sump end of the barrel toward the sump end die. The switch button 96 may now be pushed to energize the "center ram down" solenoid 90 and shift the associated four-way valve 47 to admit oil pressure to the top of the cylinder 30 and force the top ram 28 down.

When the water injection nozzle 32 strikes the barrel, the push-button 96 is released to stop the lowering ram movement. The barrel is now rotated until the nozzle moves into register with and snaps into the bung hole. The button 96 is now again pushed and held until the top die 7 meets the lower die 6. The cradle 18 will be depressed by the lower force of the upper ram against the barrel to allow the barrel to be lowered into the bottom die 6. The push-button switch 96 for the "circuit ram down" solenoid is wired so that any time it is released the valve 47 will come into a neutral locked position and the center ram will stop. The free flow resistance valve 53 in the lower feed line 50 to the center ram cylinder 30 acts to prevent the ram from dropping of its own weight.

When the center molds 6 and 7 are closed, the oil line pressure from the pumps 40, 41, backs up through the flow control valve 66 in the line 65 to the governor 67 on the pump 41. This pressure operates the dual pressure control so that the pump 41 delivers a higher pressure to feed the booster 62. This back pressure also opens the sequence valve 68 to allow the increased pump pressure to operate the booster. The booster delivers oil at high pressure through check-valves 70 in lines 69, 69' to and through the line 51 feeding the upper end of the top cylinder 30, the pressure being registered on gauge 63, and also through lines 69 and 59 to the outer ends of side cylinders 15, 15.

When the top ram 28 is substantially in its lowered position, the dog 105 at its upper extended end contacts the limit switches LS1 and LS2. Actuation of the switch LS1 closes the circuit to the push-button 98 so that the cradle 18 is depressed the remainder of its down travel. The contacting of limit switch LS3 closes the holding circuit around the "center ram down" push-button 96. Thus, when the push-button 96 is released, the "down" solenoid for the center ram valve 47 will remain energized, preventing the valve from going into neutral position and thereby maintaining down pressure on the ram.

The switch button 98 controlling the down movement of the cradle 18 is now pushed to operate the four-way valve 48 and cause the cradle to be completely lowered to clear the side dies when they are moved into place. When the cradle is all the way down a dog on the cross-piece 22 (Fig. 10) contacts limit switch LS2 and causes a closing of the circuit marked "side rams in," so that the side rams can be operated, and also effects an opening of the "cradle down" circuit to energize the "down" solenoid on valve 48.

The button for the switch 101 may now be pressed to cause an energizing of the "side rams in" solenoid 95 and an actuation of the associated four-way valve 49 to allow oil pressure to enter the outer ends of the side cylinders 15 and force the side dies 8, 8 inward. The side rams continue to move inward until either one or the other engages the barrel. The one first making the contact will then stop until the other moves in sufficiently to make contact with the barrel. At this point, both side mold housings will rest against four stop pins 35 floatingly mounted in the center mold frames or dies (Fig. 5). Back pressure, which now builds up in the oil pressure line, will open sequence valve 61 to allow the high pressure oil from the booster to flow into the line 59 feeding the rear ends of the side cylinders 15. The "side rams in" switch 101 is wired so that its closed circuit will be maintained even after the push-button is released. This will maintain the inward moving pressure on the side rams until the "side rams out" switch button 100 is pressed.

The several dies having been moved to barrel-holding position, the water pump 75 is started by pushing its switch button 68. Pressure will then immediately build up in the water line 77 until the relief valve 78 is opened by the pressure for which set and the excess water will then be by-passed to the drain. The operator now moves the control lever 81 on the valve 82 to "on" position so that the flow of high pressure water is through the nozzle 32 and into the barrel to expand it in the closed mold to its original shape with all dents removed. Opening of the water valve throws the limit switch LS6 to open the "side rams out" circuit so that the mold cannot be opened while water pressure is in the barrel.

The dent-removing operation being finished, the control lever of the water valve 80 is moved to "off" position, thus shutting off the water pressure to the barrel and opening such pressure to the drain. This movement of the water valve permits movement of the limit switch LS6 to close the "side rams out" circuit so that the side rams may be retracted. The operation of the water pump is also stopped by opening the circuit of its motor 76 by pushing the associated stop button. The side rams are retracted by pushing the "side rams out" switch button 100, which energizes solenoid 94 to move the oil valve 49 to allow oil to flow to the outer ends of the side cylinders. The valve part at the rear of the cylinders is open to the drain, thus relieving the line pressure and allowing the sequence valve 61 to close the line 69 to the booster 62. Check-valve 52 is opened through its pilot by the pump pressure, allowing the oil in the rear ends of the side ram cylinders to exhaust. When the side rams have reached fully retracted position, the limit switches LS5 and LS6 will be contacted and moved to close both the "center ram up" circuit and the "cradle up" circuit so that both the center ram and the cradle ram can now be raised. These switches also open the "side ram out" circuit to de-energize the solenoid on the four-way valve 49 and allow it to go into neutral position. The "center ram up" and "cradle up" circuits may now be closed by pressing the buttons 97 and 99, thus effecting a raise of both the center ram 39 and the cradle 18. During this operation, the pressure in the top of cylinder 30 is relieved through the drain and the sequence valve 68 closes the oil circuit to the booster 62. At the same time check-valve 52 is opened by the pump pressure to the lower end of the cylinder allowing the top end to exhaust. The cradle 18 having been raised, the reconditioned barrel may be replaced by another deformed barrel and the cycle of operations above-described repeated.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a machine of the class described having a mold with a plurality of movable sections to permit its closing about a deformed container, a fluid pressure system including rams for moving said sections and also valves for controlling fluid pressure actuated movements of the rams to move the sections to open and close the mold, means operable to boost the pressure in said system when the mold sections are closed, and means for introducing an expanding pressure into a container when held in the mold.

2. In a machine of the class described having a mold with movable sections to permit closing about a deformed container, a fluid pressure system including a cylinder and ram for each mold section and also valve means for controlling admission of fluid pressure to the cylinders to actuate the rams to move the mold sections to close and open the mold, means operable to actuate said valves to admit fluid pressure to said cylinders to selectively move the rams to open and close the mold, means operable to apply an expanding pressure internally to a container when held by the mold and shape it to the mold wall, means for preventing opening of the mold while the expanding pressure is on, and means operable to operate said last means in predetermined timed relation to the introduction and release of said expanding pressure.

3. In a machine of the class described having a mold with relatively movable opposed side and opposed end sections, fluid pressure means operable to move some at least of said sections in to form a closed cavity for receiving a deformed liquid container and out to open the mold, electrical means selectively operable to control the in and out movements of the movable mold sections, hydraulic means for expanding the container in the mold to impart a predetermined shape thereto, means for boosting the pressure in said last means, and means automatically operable to actuate said booster means to increase the fluid operating pressure on the section during the expanding operation.

4. In a machine of the class described having a mold with relatively movable opposed side and opposed end sections, fluid pressure means operable to move some at least of said sections in to form a closed cavity for receiving a deformed liquid container and out to open the mold, electrical means selectively operable to control the in and out movements of the mold sections, hydraulic means for expanding the container in the mold to impart a predetermined shape thereto, means operable to render said electrical means inoperative to cause opening of the mold when said hydraulic means is operating to expand the mold, and means operable to operate said last means in predetermined timed relation to the introduction and release of said expanding pressure.

5. In a machine of the class described, a mold having a closed cavity and having a plurality of relatively movable sections, a fluid pressure system including solenoid actuated valves for controlling movement of said sections to close and open the mold, means operable to selectively energize the valve solenoids, means operable to introduce hydraulic pressure into an expandable container in said mold to remove dents therefrom when the mold is closed, means operable to prevent opening of the mold during introduction of hydraulic pressure, and means operable to operate said last means in predetermined timed relation to the introduction and release of said expanding pressure.

6. In a machine of the class described, a mold having movable upper and side mold sections, a ram for each of said sections, the rams being operable to move the respective sections to open and close the mold, a fluid pressure system having a cylinder for each ram, a pressure source and a plurality of control valves, a second fluid pressure system having a power source and a control valve, a discharge nozzle carried by one of said rams and adapted to communicate with the interior of a container held within the closed mold sections and to introduce an expanding fluid charge into the container when said second control valve is open, means operable to selectively control said first valves to admit fluid pressure to the respective cylinders to move the rams to close and open the mold sections, ram control valves, and means for preventing operation of certain of said control valves when hydraulic pressure is being introduced into the container.

7. An arrangement as called for in claim 6, together with means operable to prevent retraction of the rams and an opening of the mold when the control valve in said second system is open.

8. An arrangement as called for in claim 6, together with means operable to boost the pressure in said first system, and means operable to actuate said booster means during introduction of an expanding fluid pressure into a mold confined container.

9. In a machine of the class described, a mold for holding a container to be reshaped by internal expansion and comprising bottom, top and opposing side sections, a reciprocably movable work-supporting cradle for raising and lowering a container relative to said bottom section to place the container in operative relation to the mold sections, means operable to raise and lower said cradle to place a container in mold-receiving position, means operable to move said top section and said side sections into mold-closing relation to said bottom die, means operable to selectively control the operation of said first and second means, and means operable to introduce fluid pressure into a container when enclosed in the mold.

10. In a machine of the class described, a sectional mold for holding a container from which dents are to be removed by an internal expanding pressure, said mold comprising a plurality of side sections and opposing end sections relatively movable to open and close the mold, rams carrying said end sections for opposed movements into and out of closed positions and at least one for rotary movement to adjust it relative to an engaged container, about the longitudinal axis of an engaged barrel, to permit relative rotary adjustment of the end sections of the mold, one of said side sections being arranged to support a container during such adjustment.

11. In a machine of the class described, a sectional mold for holding a barrel from which dents are to be removed by an internal expanding pressure, said mold comprising a plurality of side sections relatively movable to close about the circumference of a barrel and to open relative thereto, and opposing end sections relatively movable endwise of the mold to cooperate with the side sections to completely close the mold about a barrel, and pins longer than said side sections floatingly carried thereby lengthwise of the mold and coacting with the end sections to gauge the limits of inward closing movements thereof relative to the side sections.

12. In a machine of the class described, a mold forming a cavity into which a container may be placed for expansion and having a plurality of relatively movable sections, a fluid pressure system including a ram and cylinder for each movable mold section and a plurality of valves for controlling admission of fluid pressure to opposite ends of the several cylinders to move the rams and associated mold sections to mold-closing or mold-opening positions, electrical means selectively operable to move predetermined of said valves, means for introducing hydraulic pressure to a container within the closed mold to shape it to conform to the mold cavity, pressure boosting means in said system, and means operated by back pressure in said system to actuate said booster means.

13. In a machine of the class described, a mold forming a cavity into which a container may be placed for expansion and having a plurality of relatively movable sections, a fluid pressure system including a ram and cylinder for each movable mold section and a plurality of valves for controlling admission of fluid pressure to opposite ends of the several cylinders to move the rams and associated mold sections to mold-closing or mold-opening positions, electrical means selectively operable to move predetermined of said valves, means for introducing hydraulic pressure to a container within the closed mold to shape it to conform to the mold cavity, and means for preventing control operations of certain of said valves when hydraulic pressure is being introduced into the container.

14. In a machine of the class described, a mold having a plurality of sections movable into and out of barrel-holding position, a ram for moving each movable die section, a fluid pressure system associated with said rams and operable to control the movements of the rams, said system including a fluid pressure power source and a plurality of valves for controlling the action of the fluid on said rams to move them in and out, an electrical control system operable to selectively control some of said valves, hydraulic means for introducing pressure into and expanding a barrel held in said mold when closed, means operable to prevent operation of certain others of said valves to effect an opening of the mold when the the hydraulic pressure is in connection with the barrel, and means for effecting automatic operation of said last means.

15. In a machine of the class described, a mold having a plurality of sections movable into and out of barrel-holding position, a ram for moving each movable die section, a fluid pressure system associated with said rams and operable to control the movements of the rams, said system including a fluid pressure power source and a plurality of valves for controlling the action of the fluid on said rams to move them in and out, an electrical control system operable to selectively control said valves, hydraulic means for introducing pressure into and expanding a barrel held in said mold when closed, means operable to boost the pressure in said fluid pressure system, and means operable by back pressure in the fluid pressure system to effect operation of said booster means.

ALBERT F. TREMBLAY.

REFERENCES CITED

The following references are of record in the file of this patent:

UNITED STATES PATENTS

| Number | Name | Date |
| --- | --- | --- |
| 1,000,574 | Bauroth | Aug. 15, 1911 |
| 1,891,121 | Thoreson | Dec. 13, 1932 |
| 1,973,622 | Hand | Sept. 11, 1934 |
| 2,328,919 | Merriman | Sept. 7, 1943 |
| 2,354,003 | Ernst et al. | July 18, 1944 |
| 2,359,795 | Rooney | Oct. 10, 1944 |
| 2,438,999 | Hartley et al. | Apr. 6, 1948 |